United States Patent [19]

Hsu

[11] Patent Number: 5,064,535
[45] Date of Patent: Nov. 12, 1991

[54] STRAINER FOR WASHED VEGETABLES

[76] Inventor: Chun-Feng Hsu, No. 31-13, Alley 55, Lane 274, Chung-Cheng S. Rd., Yung-Kang Hsiang, Tainan Hsien, Taiwan

[21] Appl. No.: 604,090

[22] Filed: Oct. 25, 1990

[51] Int. Cl.$^5$ .............................................. B01D 33/00
[52] U.S. Cl. .................................. 210/380.1; 99/495; 99/536; 210/474; 210/477
[58] Field of Search ......................... 99/495, 511, 536; 68/213; 210/380.1, 474, 477

[56] References Cited
U.S. PATENT DOCUMENTS 3,556,303  1/1971  Diebold et al. ............... 210/380.1 X

FOREIGN PATENT DOCUMENTS 1236282  6/1960  France ............................. 210/380.1
2528684 12/1983  France ................................ 99/536

Primary Examiner—Mark Rosenbaum
Assistant Examiner—Frances Chin
Attorney, Agent, or Firm—Harness, Dickey & Pierce

[57] ABSTRACT

The housing of a strainer for washed vegetables includes a top open end a bottom opening. The housing has a rotary member at the top and a closing member at the bottom opening. The closing member comprises a device for holding the water from the washed vegetables and which device is reversable to form a seal bottom. The housing can serves as container for storing things. The rotary member can serve as chopping board.

3 Claims, 5 Drawing Sheets 5,064,535

STRAINER FOR WASHED VEGETABLES

BACKGROUND OF THE INVENTION

The invention relates to a strainer for washed vegetables, more particularly, to a strainer, the components of which can be used not only to comprise a strainer but individually, to serve purposes, such as storage containers or chopping boards.

In place where space for domestic appliances are limited, each domestic appliance we use will be much preferable if it serves several purposes. FIG. 1 shows a strainer for washed vegetable of prior art. Accordingly, it includes a rectangular housing (11) with a top open end and a plurality of bottom holes (111) through which strained water from washed vegetables can flow out. A perforated housing (12), in which washed vegetables are placed, is disposed in said housing for straining out the water. A rotatable member (A) which can spin said housing (11) to strain out the water from washed vegetables by centrifugal force is disposed on top of the housing (11).

The rotatable member (A) includes a top cover (13), a connecting plate (14) and a rotating plate (15). The connecting plate (14) is disposed on the perforated housing (12) and the rotating plate (15) is disposed on the top cover (13). When the rotating plate (15) is rotated by an eccentric knob (16) disposed on the same, it in turn spins the connecting plate (14), which spins the perforated housing, dispersing the water from the washed vegetables by centrifugal force. The water flows out of the rectangular housing (11) through the throughholes (111) wets the surrounding places. The device must therefore be used over a sink or other such area, where getting wet does not matter. Besides, the device can only be used for straining washed vegetables.

The sound from said strainer is also very loud due to the vibration and friction resultant from the rotating plate (14) not being parallel to the top cover (13). There is no means to help them parallel to one another.

SUMMARY OF THE INVENTION

Therefore, the main object of the present invention to provide a strainer for washed vegetables having an improved water outlets means so that said strainer can be used in any available place.

Another object of the invention is to provide a strainer which can also be used in variety of ways, such as chopping board and container for storing things.

Still another object of the invention is to provide a strainer which has a means to keep it quiet when rotated.

According to the present invention, the strainer for washed vegetables includes a transparent cup-shaped housing with an top open end and an annular bottom flange with an internal thread therein confining a space in said annular flange at the bottom of the housing. A closing member is detachably disposed in the confined space of the annular flange, threadably engaging the same. A perforated casing is fit in the cup-shaped housing. A rotatable member is disposed on top of the housing to spin the perforated casing so as to strain the water from the washed vegetables. The closing member includes a disc member having a first and a second side. The first side has a plurality of reservoiring grooves therein. A seal member is mounted on the second side of the disc member to prevent the strained water from the washed vegetables passing through a clearance formed between the periphery of the disc member and the internal surface of the annular flange. The disc member and the seal member are disposed in the confined space of the annular flange. A positioning ring is screwed to the confined space in the annular flange so as to support the disc member and the seal member from falling through the same. The reservoiring grooves in the first side of the disc member can hold the strained water from the washed vegetables. It is removed and emptied after straining.

The second side of the disc member serves as a closed bottom in the hollow casing so that the hollow casing can be used for storing things.

In one embodiment, the rotatable member is constructed to have an annular recess around the same so that said rotatary member can be used as a chopping board, said annular recess acting as drainage for water flowing from vegetables to be chopped. The rotatable member can also serve as a cover lid for the hollow casing.

BRIEF DESCRIPTION OF THE DRAWINGS

Other features and advantages of the present invention will become apparent in the following detailed description including drawings, all of which show a non-limiting form of the present invention, and of which.

DETAILED DESCRIPTION OF THE PREFERRED EMBODIMENT

Figure 1:
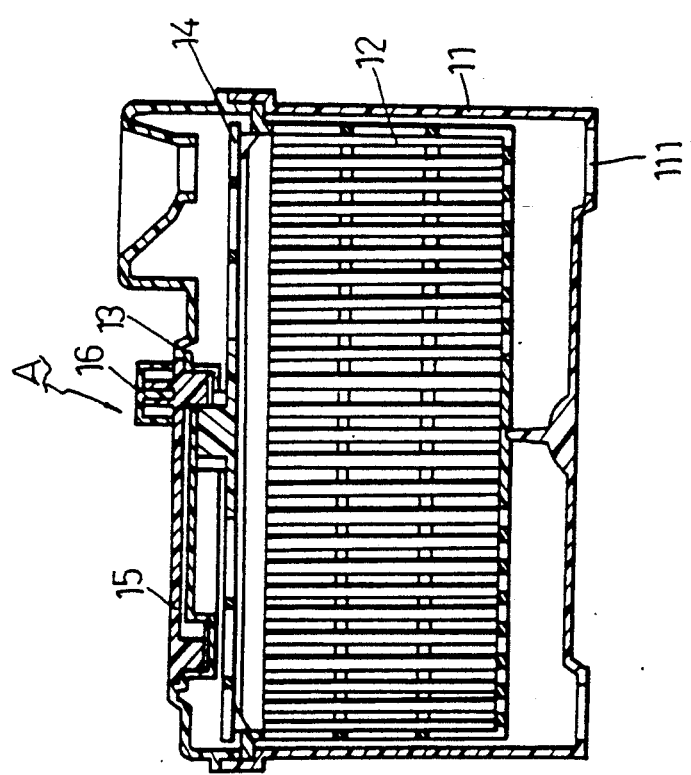
FIG. 1 shows a cross sectional view of a strainer for washed vegetables according to the prior art.
Figure 2:
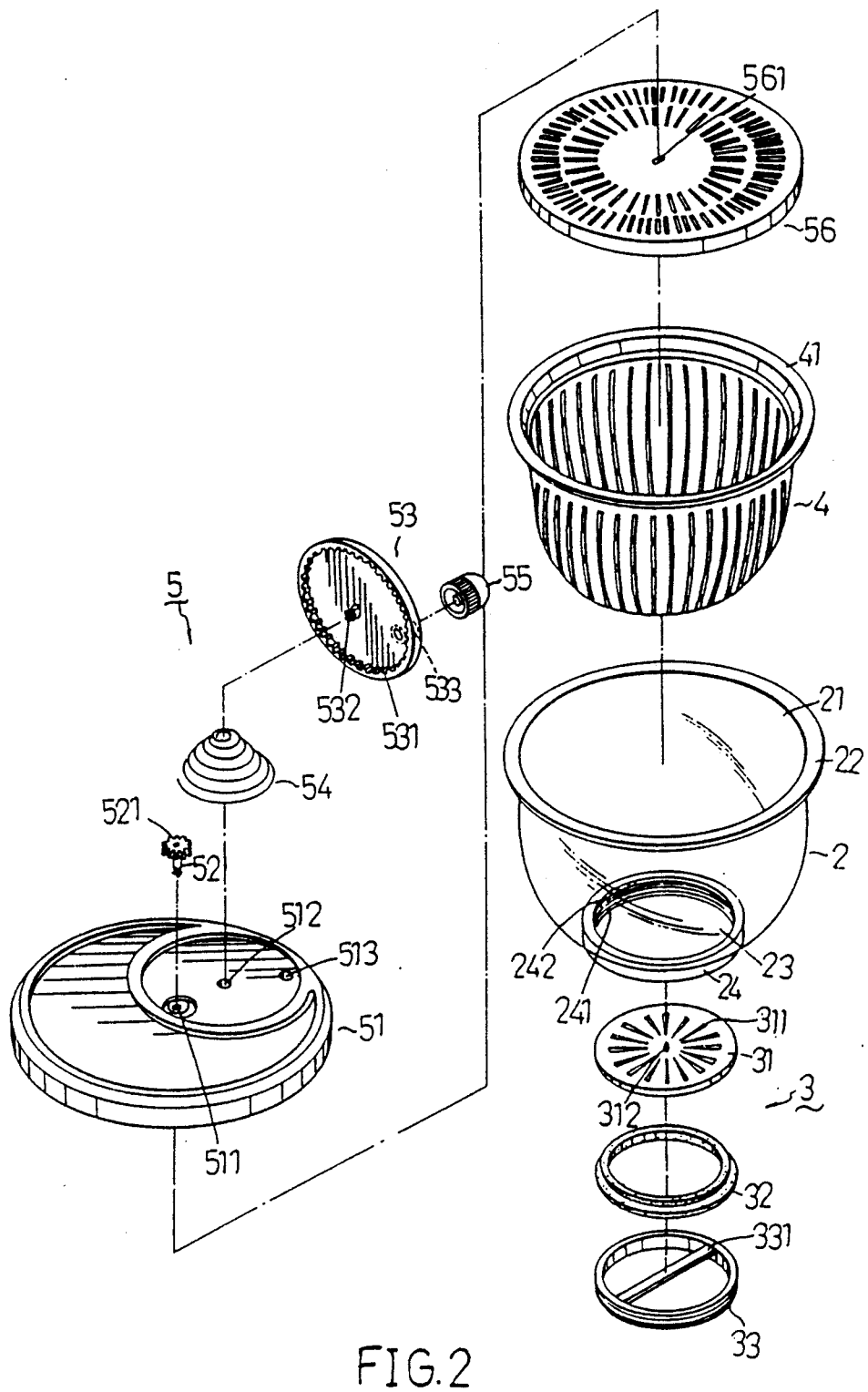
FIG. 2 is an exploded view of a strainer for washed vegetables according to the present invention.
Figure 3:
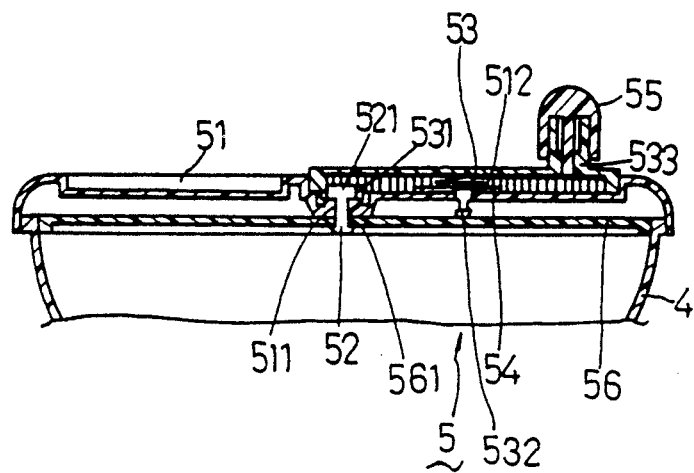
FIGS. 3 and 4 are fragmented cross sectional views of the preferred embodiment of a strainer for washed vegetables according to the present invention.

Referring to FIGS. 2 to 5, a strainer for washed vegetables according to this invention includes a cup-shaped hollow casing (2), a closing member (3), a perforated casing (4) and rotary member (5).

The cup-shaped casing (2) is a hollow casing with a top opening (21) having an outward flange (22). The bottom end has an opening (23) with an annular flange (24) extending downward therefrom. The annular flange has internal screw thread (241) therein, in which a space is confined and the top portion serves as a stoppage (242).

The closing member (3) includes a disc member (31) having a first side and a second side. The first side has a plurality of reservoiring grooves (311) in which the strained water from washed vegetables are withheld. It is to be removed and emptied after straining is completed, or the reservoir are full. The seal member (32) is detachably mounted on the second side of the disc member (31) to prevent the strained water from the washed vegetables passing through a clearance formed between the periphery of the disc member (31) and the internal surface of the annular flange (24). The disc member (31) and the seal member (32) are disposed in the confined space of the annular flange (24). A positioning ring (33) is screwed in the confined space of the annular flange (24) to support the disc member (31) and the seal member (32) so that they can not fall through the opening (23) of the annular flange (24). When use in or places where strained water can be directly disposed of, the closing member (3) need not be applied in the cup-shaped casing. The water would in that case flow directly from the bottom opening (23). A transverse bar (331) is provided in the positioning ring (33) to facilitate turning the same. A pin (312) extends upward from the center of the disc member (31) to confine the perforated casing in proper position when disposed therein, so that it can be spinned.

A perforated casing (4) has an outer flange (41), when fitted in the cup-shaped housing (2), the outer flange (41) fits with the outward flange (22) of the casing (2).

The rotary member (5) includes a top cover (51) having a central hole (511) and a eccentric holes (512) thereon; a rotary shaft (52) connected at the top end to a toothed wheel (521); a circular rotary plate (53) having inwardly facing teeth (531) around the inside of the peripheral wall thereof and an axle pin (532) at the center of the same; a knob (55) journalled on an axle pin (533), eccentrically and rotatably positioned on the rotary plate (53). The connecting plate (56) has a positioning hole (561) in its center and is mounted on the screen casing (4). When assembled, the rotary shaft (52) passes through the central hole( 511) of the top cover (51) and fixed in the positioning hole (561) of the connecting plate. By then, the toothed wheel (521) is meshed with the inwardly spaced teeth (531) of the rotary plate (53), so that when the rotary plate (53) is rotated by the eccentric knob (55) the connecting plate member (56) turns, thereby spinning the screen casing. At this time, a coil spring (54) disposed between the top cover (51) and the rotary plate (53) help both to be parallel with one another, so that the strainer would not produce loud noise as in prior art ones.

Figure 4:
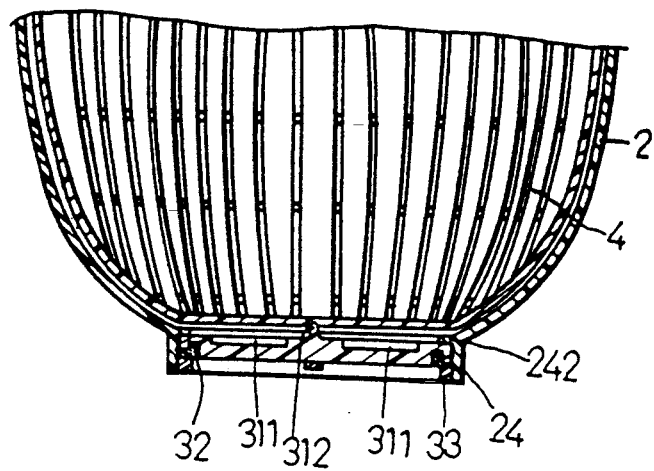
Figure 5:
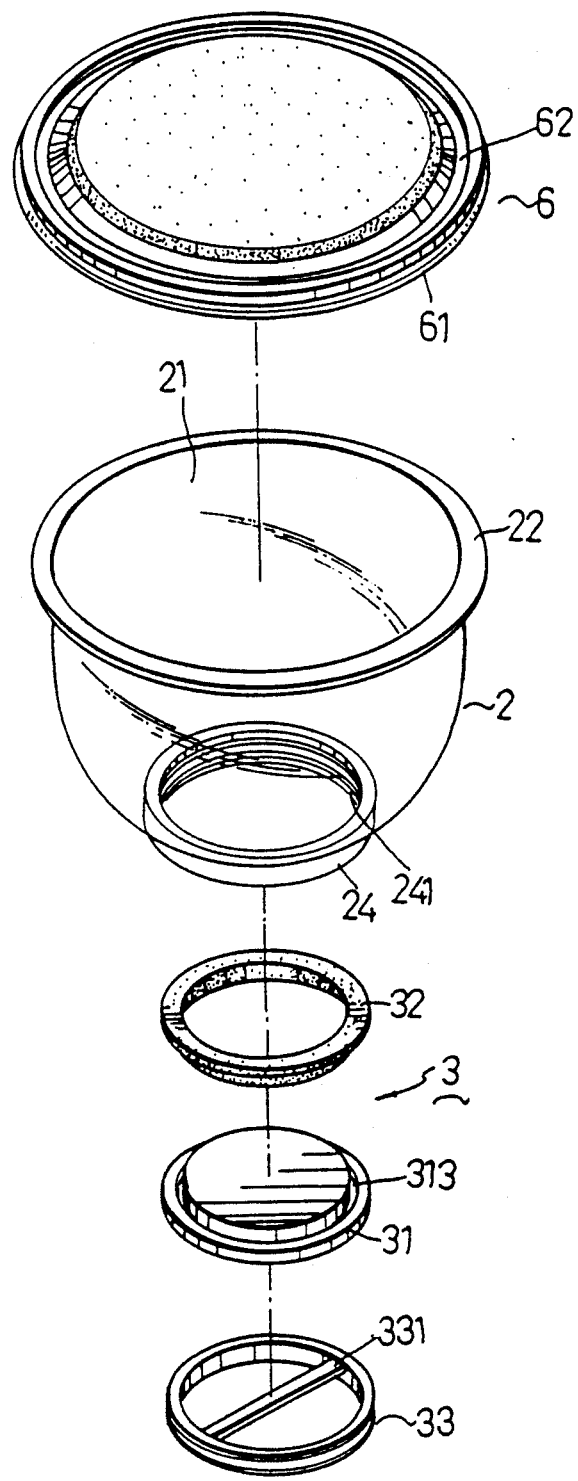
FIG. 5 is an exploded view of a second configuration of a strainer for washed vegetables according to the present invention.

FIG. 4 show a fragmented sectional views of a first preferred embodiment of the present invention. The water from the washed vegetables are strained by the centrifugal force caused by the rotation of the strainer and collected in the reservoiring grooves (311) on the first side of the disc member (31).

Figure 6:
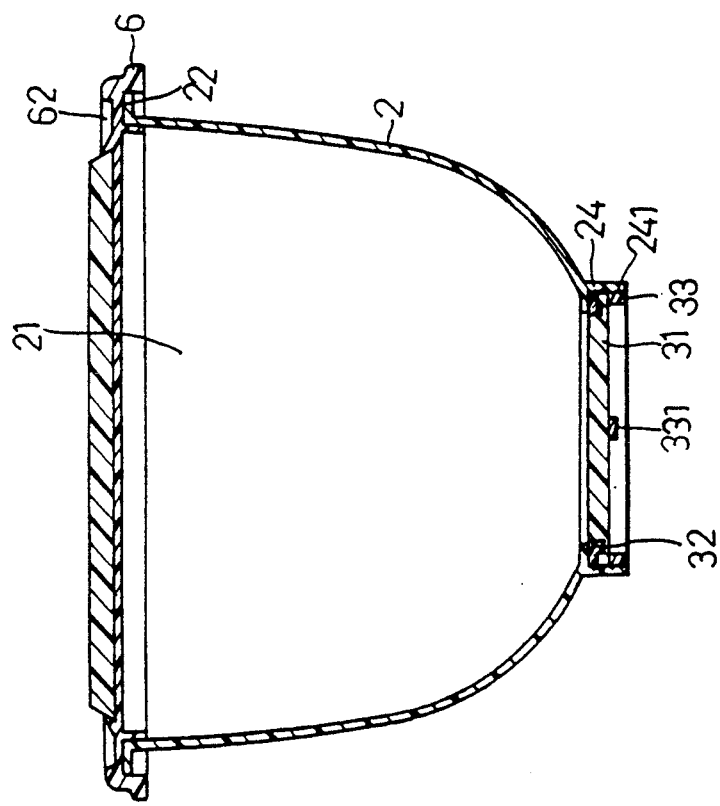
FIG. 6 is a cross sectional view of a second configuration of a strainer for washed vegetables according to the present invention.

In another embodiment, the rotatable member is replaced by a plate (6) made of hard material, such as hard plastic, which has an annular recess (62) and peripheral rim (61) around it. The peripheral rim sealingly engages the flange (22) of the housing (2). The disc member (31) is turned upside down in order to let the reservoiring grooves face downward, the second side of the disc member serves as a closed bottom in the confined space of the annular flange (24), so that the housing can be used as a container for storing things. The plate member (6) serves as a lid and at the same time can be used as a chopping board for chopping vegetables, as best illustrated in FIG. 6.

While the invention has been explained in connection with what is considered to be the most practical and preferred embodiment, the invention is not to be limited in the disclosure only, but on the contrary, it is intended to cover the various modifications and equivalent arrangements within the broadest interpretation of the present invention, so as to encompass all such modifications and equivalent arrangements.

I claim:
1. A strainer for washed vegetables including:
   a hollow casing having a top open end and a bottom opening;
   a screen casing for receiving washed vegetables, said screen casing positioned in said hollow casing;
   a rotary member detachably disposed on said top open end of said hollow casing to rotate said screen casing, thereby to strain the water from said washed vegetables received in said screen casing;
   wherein the improvement comprising said bottom opening of said hollow casing having an annular flange extending downward, said annular flange having an internal surface in which a space is confined, a disc member having a first and a second side, said first side having a plurality of reservoiring grooves therein, an annular seal member being detachably mounted to said second side of said disc member so as to prevent strained water from said washed vegetables passing through a clearance formed between the periphery of said disc member and said internal surface of said annular flange, said disc member and said annular seal member being disposed in said confined space of said annular flange, an annular ring being screwed to said annular flange to support said disc member and said annular seal member, so that said plurality of reservoiring grooves of said disc member hold strained water from said washed vegetables when said reservoiring grooves of said disc member face upward with respect to said screen casing and said second side of said disc member serves as a closed bottom in said confined space in said annular flange, when said reservoiring grooves of said disc member face downward.

2. A strainer for washed vegetables as claimed in claim 1, wherein said rotary member includes a connecting plate member connected to said screen casing; a top cover being disposed on said connecting plate member; a shaft having a first end with a toothed wheel and a second end centrally passing through said top cover to connect a central portion of said connecting plate member; a rotary plate eccentrically and rotatably mounted on said top cover, said rotary plate having inwardly facing teeth being in mesh with said toothed wheel of said shaft so that when said rotary plate is rotated, said connecting plate member turns thereby spinning said screen casing; a coil spring member disposed between said top cover and said rotary plate so that said rotary plate can generally keep parallel with said top cover when said rotary plate is rotated.

3. A strainer for washed vegetables as claim in claim 1, wherein said rotary member being a hard plate having an annular recess therearound, said hard plate being adapted for use as a chopping board, and said annular recess acting as a seal when said plate is used as a cover for said hollow casing.

* * * * *